United States Patent
Pressnell et al.

(10) Patent No.: US 12,096,096 B2
(45) Date of Patent: *Sep. 17, 2024

(54) VIDEO STREAMING SYSTEMS AND METHODS

(71) Applicant: Penthera Partners, Inc., New York, NY (US)

(72) Inventors: Joshua Pressnell, Spring Valley, OH (US); Scott Halpert, Santa Monica, CA (US)

(73) Assignee: PENTHERA PARTNERS, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/127,459

(22) Filed: Mar. 28, 2023

(65) Prior Publication Data

US 2023/0370698 A1    Nov. 16, 2023

Related U.S. Application Data

(63) Continuation of application No. 17/896,489, filed on Aug. 26, 2022, now Pat. No. 11,659,259.

(Continued)

(51) Int. Cl.
*H04N 21/858* (2011.01)
*H04N 21/234* (2011.01)
*H04N 21/81* (2011.01)

(52) U.S. Cl.
CPC ... *H04N 21/8586* (2013.01); *H04N 21/23424* (2013.01); *H04N 21/812* (2013.01)

(58) Field of Classification Search
CPC ......... H04N 21/8586; H04N 21/23424; H04N 21/812; H04N 21/8456; H04N 21/26258; H04N 21/23439; H04N 21/2187

(Continued)

(56) References Cited

U.S. PATENT DOCUMENTS 9,066,115 B1    6/2015  Cherry
11,336,506 B1    5/2022  Li (Continued)

FOREIGN PATENT DOCUMENTS

KR    20160138044    3/2015

OTHER PUBLICATIONS

International Search Report and Written Opinion issued in International Application No. PCT/US 23/20670 dated Jul. 21, 2023 (17 pages).

(Continued)

*Primary Examiner* — Cynthia M Fogg
(74) *Attorney, Agent, or Firm* — Rothwell, Figg, Ernst & Manbeck, P.C.

(57) ABSTRACT

A method that includes obtaining information that indicates an insertion point for a first ad break. The method also includes receiving a manifest associated with a video; generating a modified manifest comprising first segment locator information for causing a player to request a number of segments, wherein generating the modified manifest comprises inserting into the manifest at the insertion point the first segment locator information, wherein the first segment locator information comprises a first uniform resource locator (URL) or URL template information for generating the first URL, and wherein the first URL includes a segment identifier; providing the modified manifest to the player; receiving from the player a segment request comprising the segment identifier; and in response to receiving the segment request comprising the segment identifier, providing to the player a segment or a redirect message for causing the player to request the segment. The modified manifest comprises a duration value associated with the segment identifier, the segment has an actual duration, and the actual duration of (Continued)

the segment is less than D−1, wherein D is the duration value associated with the segment identifier in units of seconds.

10 Claims, 4 Drawing Sheets

Related U.S. Application Data (60) Provisional application No. 63/341,226, filed on May 12, 2022.
(58) Field of Classification Search
USPC .......................................................... 725/32
See application file for complete search history.

(56) References Cited

U.S. PATENT DOCUMENTS

| | | |
|---|---|---|
| 11,438,675 B1 | 9/2022 | Pressnell |
| 2012/0198492 A1 | 8/2012 | Dhruv et al. |
| 2013/0198328 A1 | 8/2013 | Green |
| 2014/0025836 A1 | 1/2014 | Gupta |
| 2014/0040026 A1 | 2/2014 | Swaminathan |
| 2014/0150019 A1 | 5/2014 | Ma |
| 2014/0365675 A1 | 12/2014 | Bhardwaj et al. |
| 2015/0371280 A1 | 12/2015 | Bjordammen |
| 2016/0316233 A1 | 10/2016 | Ghadi |
| 2017/0085933 A1 | 3/2017 | Czeck, Jr. |
| 2017/0310722 A1 | 10/2017 | Chen |
| 2018/0376177 A1 | 12/2018 | Nugent |
| 2019/0098344 A1* | 3/2019 | Shanson .............. H04N 21/266 |
| 2019/0313135 A1 | 10/2019 | Pathak |
| 2020/0077127 A1* | 3/2020 | Morrow .............. H04N 21/812 |
| 2020/0204861 A1 | 6/2020 | Loheide |
| 2020/0213645 A1 | 7/2020 | Sodagar |
| 2020/0221151 A1* | 7/2020 | Hosur .................. H04L 65/613 |
| 2020/0275148 A1 | 8/2020 | Stockhammer |
| 2021/0044844 A1* | 2/2021 | Mack .................. H04N 21/812 |
| 2021/0152896 A1 | 5/2021 | Fisher |
| 2021/0392393 A1 | 12/2021 | Olsson |
| 2023/0034983 A1* | 2/2023 | Weiner .............. H04N 21/2187 |

OTHER PUBLICATIONS

R. Seeliger, D. Silhavy and S. Arbanowski, "Dynamic ad-insertion and content orchestration workflows through manifest manipulation in HLS and MPEG-DASH," 2017 IEEE Conference on Communications and Network Security (CNS), Las Vegas, NV, USA, 2017, pp. 450-455, doi: 10.1109/CNS.2017.8228708. (Year: 2017).

2nd Written Opinion issued in International Application No. PCT/US2023/020670 dated Mar. 19, 2024 (79 pages).

* cited by examiner

VIDEO STREAMING SYSTEMS AND METHODS

CROSS-REFERENCE TO RELATED APPLICATION

This application is a continuation of U.S. application Ser. No. 17/896,489, filed on Aug. 26, 2022 (now U.S. Pat. No. 11,659,259, issued on May 23, 2023), which claims the benefit of U.S. provisional application No. 63/341,226, filed on May 12, 2022. The above identified applications are incorporated by this reference.

TECHNICAL FIELD

Disclosed are embodiments related to video streaming systems and methods.

BACKGROUND

Technology for streaming video content to a user is well established. Most video streaming technologies, including Hypertext Transfer Protocol (HTTP) Live Streaming (HLS), a technology developed by Apple, Inc., work by dividing a video (e.g., a 30 minute episode of a TV show) into many segments (e.g., 300 six-second segments) and providing to the player a segment manifest (e.g., an HLS playlist or an MPEG-DASH Media Presentation Description (MPD)) that enables the player to send to a server a request for each segment. Thus, for example, when a user wants to watch a particular video, the user's video player may make a request to a server for a particular segment manifest (or manifest for short) for the video (e.g., a manifest for the High-Definition (HD) version of the video), and, then, after obtaining the requested manifest, serially request the segments identified in the manifest (e.g., for each segment of the video, the manifest may contain a Uniform Resource Locator (URL) that identifies the filename of the file that stores the segment and the location of the file on the Internet).

After a player requests a manifest and before the manifest is provided to player, a process may select an ad set (i.e., a set of one or more ads) for an ad break identified in the manifest (e.g., using an HLS playlist, the location of the ad break and its duration can be specified using the #EXT-X-CUE-OUT and #EXT-X-CUE-IN tags) and then insert into the manifest at the ad break position information for identifying segments of the selected ad set (e.g., a set of ad segment URLs). In this way, selected ad set can be inserted into a video at a predefined ad break.

For example, Table 1 below illustrates an HLS playlist as it exists on the playlist server and Table 2 below illustrates a modified version of the HLS playlist shown in Table 1 which is provided to the player. A comparison of the two tables shows that two ad segment URLs have been inserted into the playlist.

TABLE 1

| |
|---|
| #EXTM3U |
| #EXT-X-PLAYLIST-TYPE: VOD |
| #EXT-X-TARGETDURATION: 6 |
| #EXT-X-MEDIA-SEQUENCE: 0 |
| #EXTINF: 6.0 |
| http://www.cdn.com/Video-seg1.ts |
| #EXTINF: 6.0 |
| http://www.cdn.com/Video-seg2.ts |
| #EXT-X-CUE-OUT: 30.00 |
| #EXT-X-CUE-IN: |

TABLE 1-continued

| |
|---|
| #EXTINF: 6.0 |
| http://www.cdn.com/Video-seg3.ts |

TABLE 2

| |
|---|
| #EXTM3U |
| #EXT-X-PLAYLIST-TYPE: VOD |
| #EXT-X-TARGETDURATION: 6 |
| #EXT-X-MEDIA-SEQUENCE: 0 |
| #EXTINF: 6.0 |
| http://www.cdn.com/Video-seg1.ts |
| #EXTINF: 6.0 |
| http://www.cdn.com/Video-seg2.ts |
| #EXT-X-DISCONTINUITY |
| #EXTINF: 6.0 |
| http://www.adserver.com/Ad-seg1.ts |
| #EXTINF: 6.0 |
| http://www.adserver.com/Ad-seg2.ts |
| #EXT-X-DISCONTINUITY |
| #EXTINF: 6.0 |
| http://www.cdn.com/Video-seg3.ts |

SUMMARY

Certain challenges presently exist. For instance, it may be advantageous in some situations to select for a particular ad break an eventual particular ad set to provide to a player after the manifest has already been provided to the player. But this will necessitate that the number of segments for this selected ad set must be less than or equal to number of ad segment URLs that were inserted into the manifest at the ad break. For example, if three ad segment URLs were inserted at the ad break and an eventual particular ad set for this ad break is selected where the ad set comprises four or more ad segments, then this selected ad set cannot be delivered in full to the user because at most only three ad segments will be requested by the player during the ad break.

Accordingly, in one aspect there is provided a method for overcoming this issue. In one embodiment, the method includes: receiving a manifest associated with a video, wherein the manifest indicates an insertion point for a first ad break and the manifest comprises first ad break duration information indicating a duration of the first ad break; generating a modified manifest, wherein generating the modified manifest comprises inserting into the manifest at the insertion point first segment locator information for causing the player to request a number of segments, wherein the first segment locator information comprises a first uniform resource locator (URL) (absolute or relative) or URL template information for generating the first URL, and wherein the first URL includes a request-target (a.k.a., "segment identifier") (e.g., the first URL may consist of or comprise the segment identifier) (the segment identifier may simply be the path portion of the URL or the path and query portion of the URL, and need not be unique), and further wherein the modified manifest comprises segment duration information specifying a segment duration associated with the segment identifier (e.g., associated with the first URL); (5) providing the modified manifest to the player; receiving from the player a segment request comprising the segment identifier; and in response to receiving the segment request comprising the segment identifier, providing a segment to the player, wherein the segment provided to the player is either a segment identified by the segment identifier or another segment (e.g., a segment to which the segment identifier is mapped), and the duration of the segment provided to the player is less than the segment duration associated with the segment identifier.

In another aspect there is provided a computer program comprising instructions which when executed by processing circuitry of an apparatus causes the apparatus to perform any of the methods disclosed herein. In one embodiment, there is provided a carrier containing the computer program wherein the carrier is one of an electronic signal, an optical signal, a radio signal, and a computer readable storage medium. In another aspect there is provided an apparatus that is configured to perform the methods disclosed herein. The apparatus may include memory and processing circuitry coupled to the memory.

An advantage of the embodiments disclosed herein is that they enable the selection of an ad set after a manifest has already been provided to the video player.

BRIEF DESCRIPTION OF THE DRAWINGS

The accompanying drawings, which are incorporated herein and form part of the specification, illustrate various embodiments.

DETAILED DESCRIPTION

Figure 1:
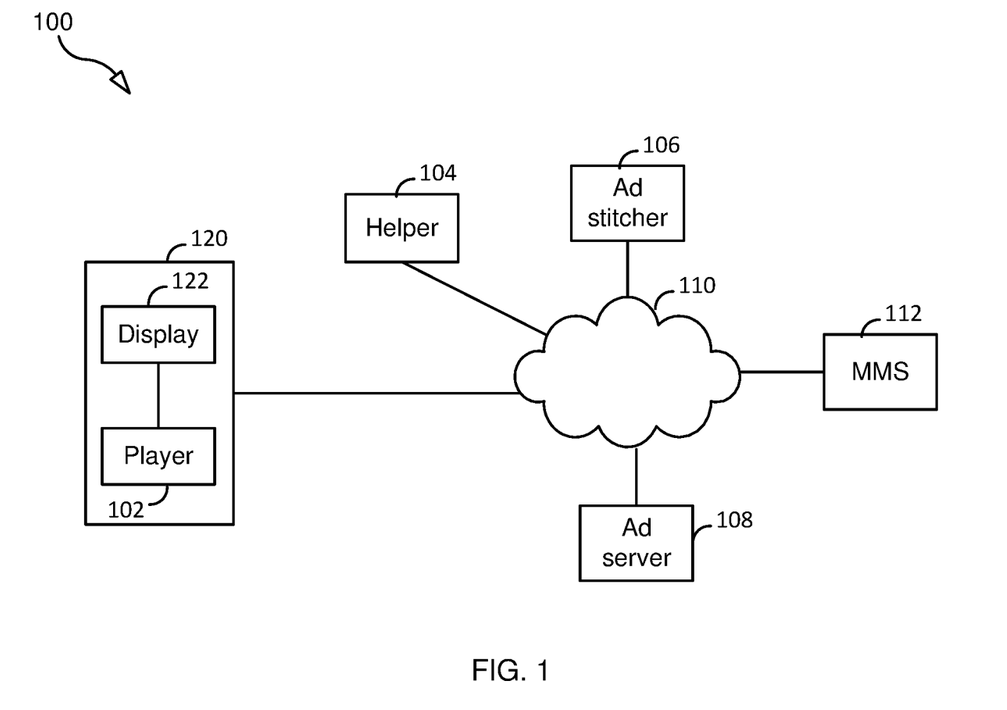
FIG. 1 illustrates a system according to an embodiment.

FIG. 1 illustrates a system 100 according to an embodiment. System 100 includes a player 102, a proxy 104 (a.k.a., helper 104), an ad stitcher 106, an ad server 108, and a media serving system (MSS) 112. Typically, the player 104 is a computer program that runs on a device 120 (e.g., mobile phone, smart TV, computer, etc.) having a display screen 122 for displaying decoded video frames. While helper 104 is illustrated as being remote from device 102, in some embodiments, helper is a computer program that also runs on device 120. Likewise, in some embodiments, helper 104 runs on a computer that is a component of MSS 112.

Figure 2:
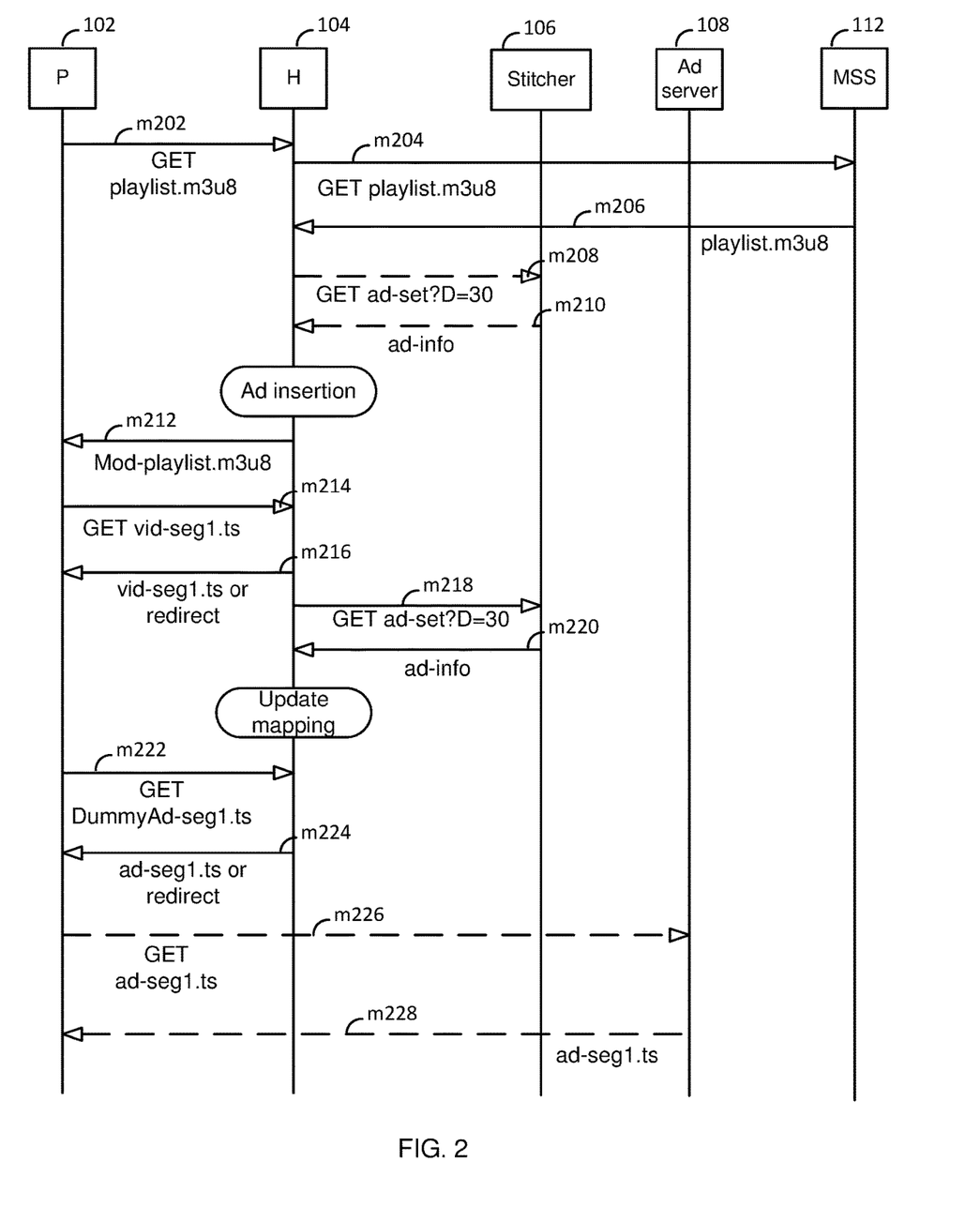
FIG. 2 is a message flow diagram according to an embodiment.

FIG. 2 is a message flow diagram illustrating a process according to an embodiment. The process may begin with player 102 sending to helper 104 a request message m202 (e.g. HTTP GET message) identifying a manifest (e.g., playlist.m3u8). In response to receiving request message m202, helper 104 sends to MSS 112 a request message m204 identifying the manifest. In response to receiving message m204, MSS 112 sends to helper 104 a response message m206 comprising the requested manifest. In some embodiments, after receiving the requested manifest, helper 104 sends to ad stitcher 106 a request message m208 identifying an ad break duration (e.g., 30 seconds) and requesting an ad set for the ad break. Ad stitcher responds to the request message by transmitting to helper a response message m210 that comprises ad information or an indication that no ads are available. The ad information may identify one or more ads and, for each identified ad, may include a set of ad segment URLs for the ad. For example, the ad information may indicate that a single 15 second ad was selected and may contain 3 ad segment URLs for this 15 second ad (e.g., adserver.com/ad-seg1.ts, adserver.com/ad-seg2.ts, adserver.com/ad-seg3.ts).

For each ad break identified in the manifest, helper 104 performs an ad break placeholder insertion process that, in at least one embodiment, comprises: i) determining the duration of the ad break; ii) determining ad set information based on (e.g., based solely on) the duration of the ad break; and iii) inserting into the manifest at the location of the ad break the determined ad set information (or information derived therefrom), which information includes segment locator information (e.g. a set of URLs). After inserting the information including the segment locator information into the manifest, thereby producing a modified manifest, helper 104 provides to player 102 response message m212, which contains the modified manifest.

In one embodiment, helper 104 has a lookup table that maps (directly or indirectly) each possible ad break duration to corresponding ad set information. Accordingly, in one embodiment the step of determining the ad set information to insert into the manifest based on (e.g., based solely on) the duration of the ad break comprises using the lookup table to determine the ad set information that is associated with the ad break duration. It is this determined ad set information (or information derived therefrom) that can be inserted into the manifest.

An example lookup table is shown below Table 3.

TABLE 3

| Ad Break Duration | Ad Set Information |
|---|---|
| 30 seconds | http://www.helper.com/DummyAd-seg1.ts<br>http://www.helper.com/DummyAd-seg2.ts<br>http://www.helper.com/DummyAd-seg3.ts<br>#PEB<br>http://www.helper.com/DummyAd-seg4.ts<br>http://www.helper.com/DummyAd-seg5.ts<br>#PEB |
| 60 seconds | http://www.helper.com/DummyAd-seg6.ts<br>http://www.helper.com/DummyAd-seg1.ts<br>http://www.helper.com/DummyAd-seg2.ts<br>http://www.helper.com/DummyAd-seg3.ts<br>#PEB<br>http://www.helper.com/DummyAd-seg4.ts<br>http://www.helper.com/DummyAd-seg5.ts<br>#PEB<br>http://www.helper.com/DummyAd-seg6.ts<br>#PEB<br>http://www.helper.com/DummyAd-seg7.ts<br>http://www.helper.com/DummyAd-seg8.ts<br>#PEB<br>http://www.helper.com/DummyAd-seg9.ts<br>#PEB<br>http://www.helper.com/DummyAd-seg10.ts<br>#PEB<br>http://www.helper.com/DummyAd-seg11.ts<br>#PEB<br>http://www.helper.com/DummyAd-seg12.ts |
| . | |

While each URL included in Table 3 is a unique URL (i.e. is different in some way for each other URL), this is not a requirement. For example, each URL included in table 3 could simply be: "www.helper.com/DummyAd-seg" or even "DummyAd-seg." The same information shown above can also be stored more efficiently as shown in Table 4 below:

TABLE 4

| Ad Break Duration | Data from which Ad Set Information to be inserted can be derived |
|---|---|
| 30 seconds | Max Number of Possible Ad Segments (Max_num) = 6<br>PEB locations = (3, 5) |

TABLE 4-continued

| Ad Break Duration | Data from which Ad Set Information to be inserted can be derived |
|---|---|
| 60 seconds | Max Number of Possible Ad Segments (Max_num) = 12 PEB locations = (3, 5, 6, 8, 9, 11) |
| . . . | |

As illustrated above, in one embodiment the ad set information associated with an ad break duration not only includes a value that specifies the maximum number of possible ad segments required for the ad set, but also an array that specifies all potential encoding breaks (PEBs) for the ad break.

Determining the Maximum Number of Possible Ad Segments:

In one embodiment, to create Table 3 or Table 4, for each possible ad break duration, the maximum number of possible ad segments (Max_num) must be determined. To determine Max_num for a particular ad break duration, one must determine: 1) the set of possible ad sets for that ad break duration and 2) for each such possible ad set, the number of segments required by that ad set. Max_num is then defined as: Max_num=max($S_1, S_2, \ldots, S_N$), where N is the number of possible ad sets for the given ad break duration and $S_i$ for i=1 to N is the number of segments required by the $i^{th}$ possible ad set for the given ad break duration.

As a specific example, given a 30 second ad break duration and given that ads come in only two flavors (15 second ad or 30 second ad), one can deduce the set of possible ad sets for the 30 second ad break. Specifically, for this example, there are two possible ad sets that can fit within the 30 second ad break (i.e., N=2): i) a 30 second ad and ii) a two consecutive 15 second ads.

As another specific example, given a 60 second ad break duration and given that ads come in only two flavors (15 second ad or 30 second ad), one can deduce the set of possible ad sets for the 60 second ad break. Specifically, for this example, there are six possible ad sets that can fit within the 60 second ad break (i.e., N=6): i) a 60 second ad, ii) two consecutive 30 second ads, iii) a 30 second ad followed by two 15 second ads, iv) two 15 seconds followed by a 30 second ad, and v) a 15 second ad followed by a 30 second ad followed by a 15 second ad, and vi) four consecutive 15 second ads.

The value $S_i$ is equal to sum ($s_{i1}, s_{i2}, \ldots, s_{iM}$), wherein M is the number of ads within the ith possible ad set and $s_{ij}$ is number of segments required by the jth ad within the ith ad set. The value $s_{ij}$ is dependent on two values: 1) the duration of the ad and 2) a segment duration. More specifically, $s_{ij}$=Ceiling ((Dur of $ad_{ij}$)/(Seg_Dur)). In one embodiment, Seg_Dur is equal to 6 seconds. According, if an ad is 15 seconds, the number of segments required for that ad is: Ceiling (15/6)=Ceiling (2.5)=3. Hence, given Seg_Dur=6, an ad set that consists of two 15 second ads requires 3+3=6 segments; likewise, an ad set that consists of four 15 second ads requires 3×4=12 segments.

Determining the Locations of Potential Encoding Breaks (PEBs)

Every possible ad set associated with a given ad break is associated with a set of encoding breaks. Accordingly, to determine all of the potential encoding breaks (PEBs) for the given ad break, one forms the union of these sets. For example, two ad sets are associated with the 30 second ad break: a first ad set consisting of a 30 second ad and a second ad set consisting of two consecutive 15 second ads. Given Seg_Dur=6, the first ad set requires only 5 segments, but Max_num for this ad break is 6 segments; hence, for the first ad set there is an encoding break located at segment 5 (or alternatively an encoding break located at segment 1). The second ad set requires 3 segments for the first 15 second ad and 3 segments for the second 15 second ad; hence for the second ad set there is an encoding break located at segment 3. Accordingly, the PEB locations for the 30 second ad break are: 3 and 5 (or 1 and 3).

As another example, given an ad break of 60 seconds and Seg_Dur=6 seconds, then there is the potential to have 10-12 ad segments in that break. In the case of HLS, that means that discontinuity tags need to be placed just before the first ad segment, just after the last ad segment, and anywhere within the 10-12 ad segments that an ad switches to a different ad or to a black segment. For example, give two 30 second ads, in one embodiment, the segments are arranged as follows: (Aij=Ad segment i for Ad j, P=Placeholder Segment):

A11-A12-A13-A14-A15-B-A21-A22-A23-A24-A25-B, so that there are encoding breaks at location 5, 6, and 11.

As another example, given two 15 second ads and a 30 second ad, in one embodiment the segments are arranged as:

A11-A12-A13-A21-A22-A23-A31-A32-A33-A34-A35-P, so that there are encoding breaks at location 3, 6, and 11.

As another example, given four 15 second ads, in one embodiment the segments are arranged as:

A1-A12-A13-A21-A22-A23-A31-A32-A33-A41-A42-A43, so that there are encoding breaks at location 3, 6, and 9.

Thus, a final structure that would support all 3 of these segment breakouts would be (where S=generic segment placeholder, and PEB indicates an potential encoding break):

S-S-S-PEB-S-S-PEB-S-PEB-S-S-S-PEB-S-S-PEB-S.

Hence, for this example the PEB array corresponding to the 60 second ad break could be: PEB=(3, 5, 6, 9, 11). As is known in the art, there is an encoding break just prior to the beginning of the ad break and another encoding break at the end of the ad break.

In some embodiments, rather than determining all of the potential encoding breaks, helper 104 simply assumes there is an encoding break after each segment, leading to the following structure:

S-PEB-S-PEB-S-PEB-S-PEB-S-PEB-S-PEB-S-PEB-S-PEB-S-PEB-S-PEB-S-PEB-S.

Hence, for this example the PEB array corresponding to the 60 second ad break could be: PEB=(1, 2, 3, 4, 5, 6, 7, 8, 9, 10, 11).

Inserting Ad Set Information into the Manifest

As noted above, in one embodiment helper 104 inserts into the manifest at the location of the ad break the determined ad set information (or, for example, segment locator information derived therefrom). Here will provide a specific example using an HLS playlist, but this disclosure also applies to other protocols, such as, for example, MPEG-DASH. For this example, the playlist shown in Table 1 is the playlist helper 104 received in response to its manifest request. For this example, we will also assume that the ad set information corresponding to the 30 second ad break identified in the playlist shown in Table 1 is the same ad set information corresponding to the 30 second ad break shown in Table 4. That is, in this example, the ad set information has Max_num=6 and PEB locations=(3, 5). Given this ad set information, helper may produce a modified playlist as shown in Table 5.

TABLE 5

EXTM3U
EXT-X-PLAYLIST-TYPE: VOD
EXT-X-TARGETDURATION: 6
EXT-X-MEDIA-SEQUENCE: 0
EXTINF: 6.0
http://www.helper.com/Video-seg1.ts
EXTINF: 6.0
http://www.helper.com/Video-seg2.ts
EXT-X-DISCONTINUITY
EXTINF: 6.0
http://www.helper.com/DummyAd-seg1.ts
EXTINF: 6.0
http://www.helper.com/DummyAd-seg2.ts
EXTINF: 6.0
http://www.helper.com/DummyAd-seg3.ts
EXT-X-DISCONTINUITY
EXTINF: 6.0
http://www.helper.com/DummyAd-seg4.ts
EXTINF: 6.0
http://www.helper.com/DummyAd-seg5.ts
EXT-X-DISCONTINUITY
EXTINF: 3.0
http://www.helper.com/DummyAd-seg6.ts
EXT-X-DISCONTINUITY
EXTINF: 6.0
http://www.helper.com/Video-seg3.ts More specifically, because Max_num=6, helper will insert at the ad break (i.e., between Video-seg2 and Video-seg3) six placeholder (or 'dummy') URLs into the playlist. Also, because this is an HLS example, for each dummy URL there must be a preceding #EXTINF tag. Additionally, because PED=(3, 5), in addition to inserting an #EXT-X-DISCONTINUITY tag between Video-seg2 and DummyAd-seg1 and inserting an #EXT-X-DISCONTINUITY tag between DummyAd-seg5 and Video-seg3 (due to the known encoding breaks there), helper also inserts an #EXT-X-DISCONTINUITY tag between DummyAd-seg3 and DummyAd-seg4 and insert an #EXT-X-DISCONTINUITY tag between DummyAd-seg5 and DummyAd-seg6 because these are locations of the potential encoding breaks.

Additionally, as shown in the table above, in some embodiments, helper 104 may replace the string "cdn.com" with "helper.com" so that all of the content segment requests in addition to the ad segment requests will be sent by player 102 to helper 104. In other embodiments, helper selectively replaces the string "cdn.com" with "helper.com" so that not all occurrences are changed. More generically, helper may modify the manifest so that at least some (i.e., all or less than all) segments requests are sent to the helper.

Additionally, in some embodiments, helper 104 will also append the following text to the playlist:

TABLE 6

EXT-X-DISCONTINUITY
EXTINF: 1.0,
http://www.helper.com/AdditionalDummyAd-seg1.ts
EXTINF: 1.0,
http://www.helper.com/AdditionalDummyAd-seg2.ts
EXTINF: 1.0, TABLE 6-continued http://www.helper.com/AdditionalDummyAd-seg3.ts
EXTINF: 1.0,
http://www.helper.com/AdditionalDummyAd-seg4.ts
EXTINF: 1.0,
http://www.helper.com/AdditionalDummyAd-seg5.ts
EXTINF: 1.0,
http://www.helper.com/AdditionalDummyAd-seg6.ts That is, in one embodiment, helper appends to the manifest a number of additional dummy URLs equal in number to the number dummy URLs added to the manifest. Additionally, as shown in Table 6 above, helper 104 may specify that the duration of each additional dummy segment is 1 second.

As noted above, in some embodiments helper 104 may send request m208 to ad stitcher 106 prior to performing the ad break placeholder insertion process. In this embodiment, helper 104 may be configured to modify the ad break placeholder insertion process so that instead of inserting all of the dummy URLs into the manifest it inserts less than all, depending on the response m210 from stitcher 106. For example, if the ad information included in response m210 indicates that a single 15 second ad was selected and contains 3 ad segment URLs for this 15 second ad (e.g., adserver.com/ad-seg1.ts, adserver.com/ad-seg2.ts, adserver.com/ad-seg3.ts), then the modified manifest produced by helper 104 may appear as shown in Table 7 below. Alternatively, all of the dummy URLs are inserted into the manifest as shown in Table 5 and helper maps the first three dummy URLs to the ad segment URLs received in response m210 (an example of such a mapping is shown in Tables 9 and 10, below).

TABLE 7

EXTM3U
EXT-X-PLAYLIST-TYPE: VOD
EXT-X-TARGETDURATION: 6
EXT-X-MEDIA-SEQUENCE: 0
EXTINF: 6.0
http://www.helper.com/Video-seg1.ts
EXTINF: 6.0
http://www.helper.com/Video-seg2.ts
EXT-X-DISCONTINUITY
EXTINF: 6.0
http://www.helper.com/ad-seg1.ts
EXTINF: 6.0
http://www.helper.com/ad-seg2.ts
EXTINF: 3.0
http://www.helper.com/ad-seg3.ts
EXT-X-DISCONTINUITY
EXTINF: 6.0
http://www.helper.com/DummyAd-seg1.ts
EXTINF: 6.0
http://www.helper.com/DummyAd-seg2.ts
EXT-X-DISCONTINUITY
EXTINF: 3.0
http://www.helper.com/DummyAd-seg3.ts
EXT-X-DISCONTINUITY
EXTINF: 6.0
http://www.helper.com/Video-seg3.ts As yet another example, if the ad information included in response m210 indicates that a single 30 second ad was selected and contains 5 ad segment URLs for this 30 second ad (e.g., adserver.com/ad-seg1.ts, adserver.com/ad-seg2.ts, adserver.com/ad-seg3.ts, adserver.com/ad-seg4.ts, adserver.com/ad-seg5.ts), then the modified manifest produced by helper 104 may appear as shown in Table 8 below. Alternatively, all of the dummy URLs are inserted into the manifest as shown in Table 5 and helper maps five consecutive dummy URLs to the ad segment URLs received in response m210 (an example of such a mapping is shown in Tables 11 and 12, below).

TABLE 8

EXTM3U
EXT-X-PLAYLIST-TYPE: VOD
EXT-X-TARGETDURATION: 6
EXT-X-MEDIA-SEQUENCE: 0
EXTINF: 6.0
http://www.helper.com/Video-seg1.ts
EXTINF: 6.0
http://www.helper.com/Video-seg2.ts
EXT-X-DISCONTINUITY
EXTINF: 6.0
http://www.helper.com/ad-seg1.ts
EXTINF: 6.0
http://www.helper.com/ad-seg2.ts
EXTINF: 6.0
http://www.helper.com/ad-seg3.ts
EXTINF: 6.0
http://www.helper.com/ad-seg4.ts
EXTINF:6.0
http://www.helper.com/ad-seg5.ts
EXT-X-DISCONTINUITY
EXTINF: 3.0
http://www.helper.com/DummyAd-seg1.ts
EXT-X-DISCONTINUITY
EXTINF: 6.0
http://www.helper.com/Video-seg3.ts Referring back to FIG. 2, after player 102 receives the modified manifest (e.g., the playlist shown in Table 6, Table 7 or Table 8), player 102 begins sending segment requests according to the manifest. For example, as shown in FIG. 2, player 102 sends to helper 104 a request message m214 for vid-seg1.ts. Helper 104 responds by providing to player 102 a response message 216, which either contains the requested segment (vid-seg1.ts) or a redirect message that causes player 102 to send a request message to a server (e.g. a server within MSS) for the segment.

At some point before player 102 requests the segment DummyAd-seg1.ts, or in response to receiving the request for segment DummyAd-seg1.ts (e.g., an HTTP GET request that includes a request target containing or consisting of the string "/DummyAd-set1.ts"), helper 104 transmits to ad stitcher 106 a request message m218 indicating that helper is requesting one or more ads (i.e. a set of ads) to fill a 30 second ad break. Ad stitcher 106 responds by transmitting to helper 104 a response message m220 that contains either X ad segment URLs or X ad segments, where X is greater than or equal to zero. More specifically, assuming only two flavors of ads (15 second ads or 30 second ads) and a segment duration of 6 seconds, then X is one of: 0, 3, 5, or 6. If X is 3, this means ad stitcher has selected a single 15 second ad; if X is 5, this means ad stitcher has selected a single 30 second ad; if X is 6, this means ad stitcher selected two fifteen second ads.

If X is greater than zero, then helper 140 will performing a mapping process that results in mapping X of the dummy URLs to a corresponding one of the X ad URLs. For example, assume that the stitcher returned X=3 ad URLs as follows: www.adserver.com/ad1-seg1.ts; www.adserver.com/ad1-seg2.ts; and www.adserver.com/ad1-seg3.ts. In this case, helper will map three consecutive dummy URLs to these ad URLs as shown in the table 9 or table 10 below as examples, whereas the other three dummy URLs that make up the ad break are either mapped to a short (e.g. 500 millisecond) placeholder segment (e.g., a segment that contains nothing but blank video frames or a segment that contains for example still video of a logo) or mapped to i) ad segment URLs received in response message m210 and/or ii) ad segment URLs corresponding to ad segments received in response message m210.

TABLE 9

| | |
|---|---|
| http://www.helper.com/DummyAd-seg1.ts | www.adserver.com/ad1-seg1.ts |
| http://www.helper.com/DummyAd-seg2.ts | www.adserver.com/ad1-seg2.ts |
| http://www.helper.com/DummyAd-seg3.ts | www.adserver.com/ad1-seg3.ts |
| http://www.helper.com/DummyAd-seg4.ts | placeholder_segment.ts |
| http://www.helper.com/DummyAd-seg5.ts | placeholder_segment.ts |
| http://www.helper.com/DummyAd-seg6.ts | placeholder_segment.ts |

TABLE 10

| | |
|---|---|
| http://www.helper.com/DummyAd-seg1.ts | placeholder_segment.ts |
| http://www.helper.com/DummyAd-seg2.ts | placeholder_segment.ts |
| http://www.helper.com/DummyAd-seg3.ts | placeholder_segment.ts |
| http://www.helper.com/DummyAd-seg4.ts | www.adserver.com/ad1-seg1.ts |
| http://www.helper.com/DummyAd-seg5.ts | www.adserver.com/ad1-seg2.ts |
| http://www.helper.com/DummyAd-seg6.ts | www.adserver.com/ad1-seg3.ts |

As another example, assume that the stitcher returned X=5 ad URLs as follows: www.adserver.com/ad1-seg1.ts; www.adserver.com/ad1-seg2.ts; www.adserver.com/ad1-seg3.ts; www.adserver.com/ad1-seg4.ts; and www.adserver.com/ad1-seg5.ts. In this case, helper will map five consecutive dummy URLs to these ad URLs as shown in Table 11 or Table 12 below.

TABLE 11

| | |
|---|---|
| http://www.helper.com/DummyAd-seg1.ts | www.adserver.com/ad1-seg1.ts |
| http://www.helper.com/DummyAd-seg2.ts | www.adserver.com/ad1-seg2.ts |
| http://www.helper.com/DummyAd-seg3.ts | www.adserver.com/ad1-seg3.ts |
| http://www.helper.com/DummyAd-seg4.ts | www.adserver.com/ad1-seg4.ts |
| http://www.helper.com/DummyAd-seg5.ts | www.adserver.com/ad1-seg5.ts |
| http://www.helper.com/DummyAd-seg6.ts | placeholder_segment.ts |

TABLE 12

| | |
|---|---|
| http://www.helper.com/DummyAd-seg1.ts | placeholder_segment.ts |
| http://www.helper.com/DummyAd-seg2.ts | www.adserver.com/ad1-seg1.ts |
| http://www.helper.com/DummyAd-seg3.ts | www.adserver.com/ad1-seg2.ts |
| http://www.helper.com/DummyAd-seg4.ts | www.adserver.com/ad1-seg3.ts |
| http://www.helper.com/DummyAd-seg5.ts | www.adserver.com/ad1-seg4.ts |
| http://www.helper.com/DummyAd-seg6.ts | www.adserver.com/ad1-seg5.ts |

At some point after receiving the response from the stitcher and mapping dummy URLs to ad URLs, helper 104 will respond to request messages corresponding to the dummy URLs, and helper may respond according to the mappings. For example, assuming the mapping shown in Table 9, when helper 104 processes a request message m222 for DummyAd-seg1.ts (e.g., an HTTP Get message wherein the request target of the GET message contains or consists of the string "DummyAd-seg1.ts"), helper 104 responds to such request by providing to player 102 a response message m224 that contains ad1-seg1.ts or an HTTP redirect containing the corresponding ad URL. If response message m224 includes the redirect, this causes player 102 to transmit ad server 108 a request message m226 identifying the requested ad segment and then ad server 108 responds by transmitting a response message m228 that contains the requested ad segment (or it could possibly contain another redirect).

Likewise, assuming the mapping shown in Table 9, when helper 104 receives request messages for DummyAd-seg2.ts and DummyAd-seg3.ts, helper will respond to each such request, respectively, by either providing to the player ad1-seg2.ts and ad1-seg3.ts, respectively, or providing to the player an HTTP redirect containing the corresponding ad URL. That is, when helper receives a request for DummyAd-segY.ts, helper either returns ad1-segY.ts or an HTTP redirect message containing the ad URL for ad1-segY.ts (i.e., www.adserver.com/ad1-segY.ts), where Y=1, 2, 3. In contrast, (still assuming the mapping shown in Table 9) when helper 104 receives a request for DummyAd-segX.ts (X=4, 5, or 6), then helper 104 provides to the player a short placeholder segment (placeholder_segment.ts) (e.g., a 500 ms or 1 second segment) (this can be happen if DummyAd-segX.ts is not pre-mapped to a placeholder segment because, in such a case, helper may have logic that instructs it to respond to a request for a segment with a placeholder (or other selected segment) when the requested segment is not pre-mapped to an ad segment or placeholder segment).

As noted above, in embodiments in which helper 104 receives from stitcher 106 ad segment URLs identifying ad segments selected by stitcher 106 (or the ad segments themselves) before helper 104 performs the ad break placeholder insertion process (see above description of message m210), helper 104 may insert into the manifest the ad segment URLs corresponding to the ad segments selected by stitcher 106. In such an embodiment, there is a possibility that, in performing the mapping process described above, helper 104 decides to cause the player to request ad segments identified in message m220 rather than the ad segments identified in message m210. For example, assume that message m210 identified the following three add segments (ad1-seg1.ts, ad1-seg2.ts, and ad1-seg3.ts) and assume that message m220 identified at the following five add segments (ad2-seg1.ts, ad2-seg2.ts, ad2-seg3.ts, ad2-seg4.ts, ad2-seg5.ts) and that helper 104 has decided to replace ad1 with ad2 (e.g., ad2 may be more valuable than ad1), then in this scenario the mapping process may produce the following mapping:

TABLE 13

| Ad segment URLs inserted into Manifest | Corresponding URLs |
|---|---|
| http://www.helper.com/ad1-seg1.ts | www.adserver.com/ad2-seg1.ts |
| http://www.helper.com/ad1-seg2.ts | www.adserver.com/ad2-seg2.ts |
| http://www.helper.com/ad1-seg3.ts | www.adserver.com/ad2-seg3.ts |
| http://www.helper.com/DummyAd-seg1.ts | www.adserver.com/ad2-seg4.ts |
| http://www.helper.com/DummyAd-seg2.ts | www.adserver.com/ad2-seg5.ts |
| http://www.helper.com/DummyAd-seg3.ts | placeholder_segment.ts |

As noted above, there are embodiments in which helper 104 inserts additional dummy URLs to the manifest (see Table 6). In these embodiments, when a URL for a dummy ad segment is not mapped to an ad URL or actual ad segment, but rather is mapped to the short placeholder segment (see, e.g., DummyAd-seg6.ts in Table 9), then helper will map the corresponding additional dummy URL (e.g., the URL for AdditionalDummyAd-seg6.ts) to a long placeholder segment (e.g., a 3 second or 6 second placeholder segment) such that when helper receives a request for this corresponding additional dummy segment helper returns the long placeholder segment rather than the short placeholder segment it would have otherwise returned. For specific examples with reference to Table 9, when helper 104 receives a request for AdditionalDummyAd-segY.ts (Y=1, 2, 3), helper return the short (e.g., 500 ms) placeholder segment because DummyAd-segY.ts is mapped to ad1-segY.ts, whereas when helper receives a request for AdditionalDummyAd-segX.ts (X=4, 5), helper return a first long (e.g., a 6 second) placeholder segment because DummyAd-segX.ts is mapped to a placeholder segment and the #EXTINF value for these dummy segments is set to 6 seconds, and when helper receives a request for AdditionalDummyAd-seg6.ts, helper return a second long (e.g., a 3 second) placeholder segment because DummyAd-seg6.ts is mapped to a placeholder segment and the #EXTINF value for this dummy segments is set to 3 seconds. In this manner, the total duration of the video, as defined in the manifest to the player, is maintained.

In other words, when player 102 requests, for example, DummyAd-seg4.ts, which we will assume is mapped to a short placeholder segment, instead of returning a 6 second segment as specified in the playlist by the #EXTINF tag for that segment, the helper instead returns a short (e.g. 500 ms) placeholder segment. Accordingly, when player requests AdditionalDummyAd-seg4.ts, which corresponds to DummyAd-seg4.ts, instead of returning a 1 second segment as specified by the #EXTINF tag for that segment, helper 104 returns a 6 second black segment. In this manner, the duration of the video remains constant and helper 104 is simply rearranging (conceptually) where the "black video" is being played within the timeline. In an extreme example, helper 104 could do this for the entire ad break, reducing what would be a 60 second break to 6 seconds of black (or a chosen placeholder video).

In another embodiment, rather than mapping dummy URLs that were inserted into the manifest to a placeholder segment when there is no available ad segment, the dummy URLs are mapped to information (e.g., a pre-defined status code (e.g., HTTP 404 Not Found response status code) or other information) that indicates to the player that the requested segment is being skipped. That is, in this embodiment, when helper receives a request for, for example, DummyAd-seg1.ts and this dummy URL has not been mapped to any ad segment, helper responds to the request by sending to the player a response message with information (e.g., a pre-defined status code (e.g., HTTP 404 Not Found response status code) or other information) that indicates to the player that the requested segment is being skipped. Such a response message may contain a status code (e.g., 400 Not Found) with no response body where the status code indicates that no segment is being returned in response to the request (i.e., the segment is being skipped). As another example, the response message includes a status code (e.g., 200 OK) and a content-length parameter set to 0 to indicate that no segment is being returned in response to the request. As yet another example, the response message comprises a header and the information that indicates to the player that the requested segment is being skipped is contained in the header. As yet another example, the response message comprises a non-zero length body and the information that indicates to the player that the requested segment is being skipped is contained in the body of the message.

Figure 4:
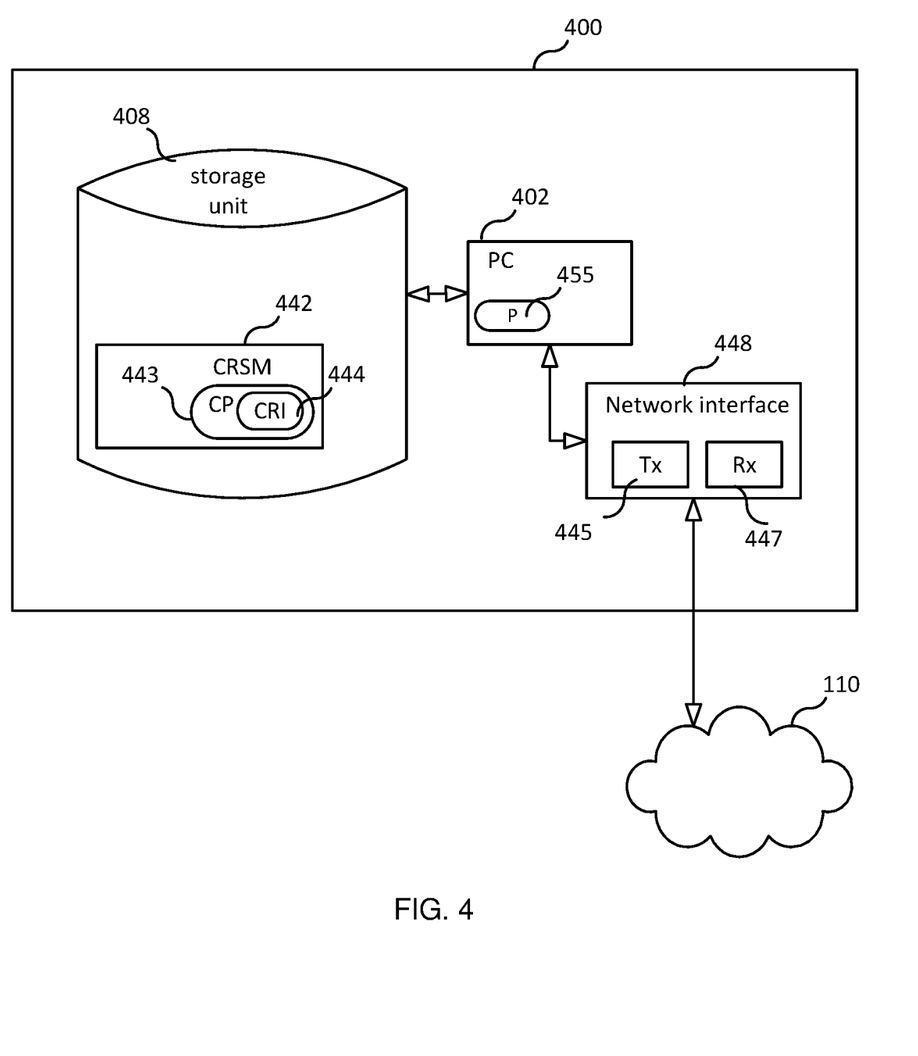
FIG. 4 is a block diagram an apparatus according to an embodiment.

FIG. 4 is a block diagram of apparatus 400, according to some embodiments, that may implement helper 104. In some embodiments, apparatus 400 may be a component of device 120. As shown in FIG. 4, apparatus 400 may comprise: processing circuitry (PC) 402, which may include one or more processors (P) 455 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., apparatus 400 may be a distributed computing apparatus); at least one network interface 448 (e.g., a physical interface or air interface) comprising a transmitter (Tx) 445 and a receiver (Rx) 447 for enabling apparatus 400 to transmit data to and receive data from other network nodes connected to network 110 (e.g., an Internet Protocol (IP) network) to which network interface 448 is connected (physically or wirelessly) (e.g., network interface 448 may be coupled to an antenna arrangement comprising one or more antennas for enabling apparatus 400 to wirelessly transmit/receive data); and a storage unit (a.k.a., "data storage system") 408, which may include one or more non-volatile storage devices and/or one or more volatile storage devices. In embodiments where PC 402 includes a programmable processor, a computer readable storage medium (CRSM) 442 may be provided. CRSM 442 may store a computer program (CP) 443 comprising computer readable instructions (CRI) 444. CRSM 442 may be a non-transitory computer readable medium, such as, magnetic media (e.g., a hard disk), optical media, memory devices (e.g., random access memory, flash memory), and the like. In some embodiments, the CRI 444 of computer program 443 is configured such that when executed by PC 402, the CRI causes apparatus 400 to perform steps described herein (e.g., steps described herein with reference to the flow charts). In other embodiments, apparatus 400 may be configured to perform steps described herein without the need for code. That is, for example, PC 402 may consist merely of one or more ASICs. Hence, the features of the embodiments described herein may be implemented in hardware and/or software.

Summary of Various Embodiments

Figure 3:
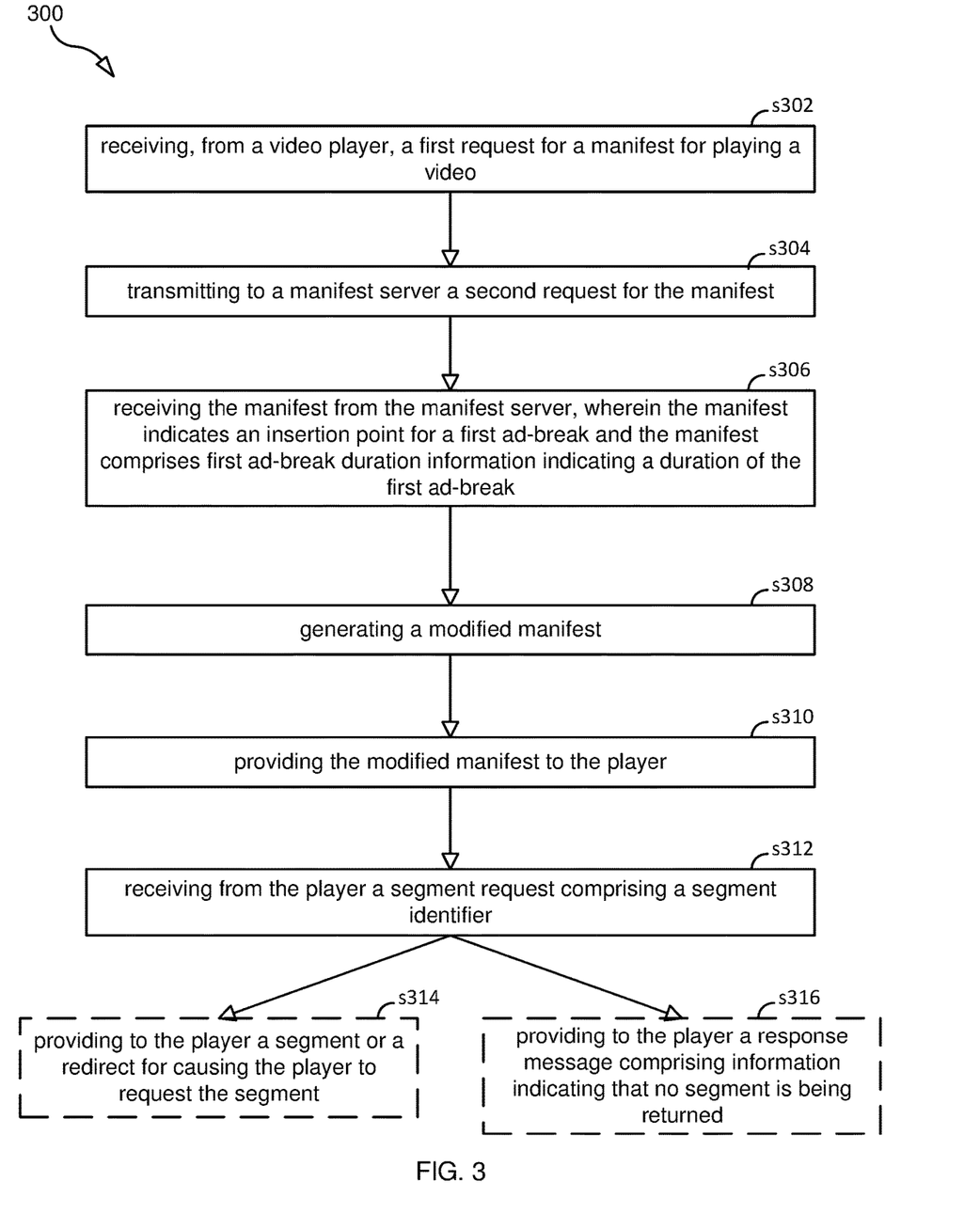
FIG. 3 is a flowchart illustrating a process according to an embodiment.

1. A method 300 (see flowchart shown in FIG. 3), comprising: receiving (step s302), from a video player, a first request for a manifest for playing a video; transmitting (step s304) to a manifest server a second request for the manifest; receiving (step s306) the manifest from the manifest server, wherein the manifest indicates an insertion point for a first ad break and the manifest comprises first ad break duration information indicating a duration of the first ad break; generating (step s308) a modified manifest, wherein generating the modified manifest comprises inserting into the manifest at the insertion point first segment locator information for causing the player to request a number of segments, wherein the first segment locator information comprises a first uniform resource locator (URL) (absolute or relative) or URL template information for generating the first URL, and wherein the first URL includes a segment identifier (e.g., the first URL may consist of or comprise the segment identifier), and further wherein the modified manifest comprises segment duration information specifying a segment duration associated with the segment identifier; providing (step s310) the modified manifest to the player; receiving (step s312) from the player a segment request comprising the segment identifier; and in response to receiving the segment request comprising the segment identifier, providing (step s314) to the player a segment or a redirect message for causing the player to request the segment, wherein the segment is either a segment identified by the segment identifier or another segment (e.g., a segment to which the segment identifier is mapped), and the duration of the segment is less than the segment duration associated with the segment identifier.

2. The method of embodiment 1, wherein the first segment locator information comprises a list of N1 URLs comprising the first URL (but there is no requirement that the first URL be positioned first in the list; the first URL may be positioned anywhere in the list), where N1>1, or the first segment locator information comprises URL template information that can be used by the player to generate the list of N1 URLs.

3. The method of embodiment 2, wherein the duration of the first ad break is associated with a set of two or more potential ad sets, wherein each potential ad set requires a specific number of segments, and N1=max (s1, s2, . . . , sM), where si for i=1 to M is the specific number of segments required by the ith potential ad set.

4. The method of embodiment 2 or 3, wherein the first segment locator information further comprises, for each URL in the list of N1 URLs, metadata for the URL (e.g., #EXT-X-INF tag, byte range information).

5. The method of embodiment 2, 3, or 4, wherein generating the modified manifest comprises inserting into the manifest first segment grouping information for forming two or more groups of the N1 number of URLs.

6. The method of embodiment 5, wherein the N1 URLs further comprises a second URL, and inserting into the manifest the first segment grouping information comprises inserting into the manifest a discontinuity tag (e.g., an HLS EXT-X-DISCONTINUITY tag) such that in the modified manifest the discontinuity tag comes after the first URL but comes before the second URL.

7. The method of embodiment 5, wherein the first segment grouping information comprises: a first period element comprising: i) a first subset of the N1 URLs or ii) URL template information for use in generating the first subset of URLs; and a second period element comprising: i) a second subset of the N1 URLs or ii) URL template information for use in generating the second subset of URLs.

8. The method of any one of embodiments 1-7, further comprising: after providing the modified manifest to the player, submitting to an ad stitcher an ad request for triggering the ad stitcher to select a set of ads to fill the first ad break; receiving from the ad stitcher a response responsive to the ad request the response comprising a set of M segment URLs or a set of M ad segments, where M≤N1, wherein the set of M segment URLs comprises a first ad URL or the set of M ad segments comprises a first ad segment; and mapping the first URL included in the list of N1 URLs with the first ad URL or the first ad segment.

9. The method of any one of embodiments 1-8, wherein at the time the first segment locator information is inserted into the manifest, the first URL is a dummy URL (e.g. DummyAd-seg1.ts) that is associated with no segment or a placeholder segment (e.g., a segment which consists essentially of black frames).

10. The method of any one of embodiments 1-9, further comprising; prior to generating the modified manifest, using information indicating the duration of the first ad break to obtain first ad set information, wherein the first ad set information comprises the first segment locator information or the first segment locator information is derived using the first ad set information.

11. The method of any one of embodiments 1-10, wherein the duration of the segment is less than D−1, wherein D is the specified segment duration in units of seconds.
12. The method of any one of embodiments 1-10, wherein the duration of the segment is less than 1 second.
13. The method of embodiment 11 or 12, wherein the segment is a placeholder segment.
14. The method of any one of embodiments 1-13, wherein the manifest indicates an insertion point for a second ad break and the manifest comprises second ad break duration information indicating a duration of the second ad break, and generating the modified manifest further comprises inserting into the manifest at the insertion point for the second ad break second segment locator information for causing the player to request a number of segments, wherein the second segment locator information comprises a list of N2 URLs, where N2>1, or the second segment locator information comprises second URL template information that can be used by the player to generate the list of N2 URLs.
15. A method 300 (see flowchart shown in FIG. 3), comprising: receiving (step s302), from a video player, a first request for a manifest for playing a video; transmitting (step s304) to a manifest server a second request for the manifest; receiving (step s306) the manifest from the manifest server, wherein the manifest indicates an insertion point for a first ad break and the manifest comprises first ad break duration information indicating a duration of the first ad break; generating (step s308) a modified manifest, wherein generating the modified manifest comprises inserting into the manifest at the insertion point first segment locator information for causing the player to request a number of segments, wherein the first segment locator information comprises a first uniform resource locator (URL) (absolute or relative) or URL template information for generating the first URL, and wherein the first URL includes a segment identifier (e.g., the first URL may consist of or comprise the segment identifier), and further wherein the modified manifest comprises segment duration information specifying a segment duration associated with the segment identifier; providing (step s310) the modified manifest to the player; receiving (step s312) from the player a segment request comprising the segment identifier; and in response to receiving the segment request comprising the segment identifier, providing (step s316) to the player a response message comprising information indicating that no segment is being returned.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:
1. A method, comprising:
receiving a manifest associated with a video;
generating a modified manifest comprising:
  i) a set of N1 URLs, where N1>1; and
  ii) a corresponding set of N1 duration values, wherein
    the set of N1 URLs comprises a first URL comprising a first segment identifier and a second URL comprising a second segment identifier,
    each one of the N1 duration values is associated with only a single one of the URLs included in the set of N1 URls,
    the set of duration values comprise a first duration value and a second duration value,
    the first duration value, D1, is associated with only the first URL, and
    the second duration value, D2, is associated with only the second URL;
providing the modified manifest to a player;
receiving from the player a segment request comprising the first segment identifier;
in response to receiving the segment request comprising the first segment identifier, providing to the player a first segment or a redirect message for causing the player to request the first segment;
receiving from the player a segment request comprising the second segment identifier; and
in response to receiving the segment request comprising the second segment identifier, providing to the player a second segment or a redirect message for causing the player to request the second segment, wherein
the first segment has a duration, and
the duration of the first segment is greater than D1-1 second, where D1 is in units of seconds
the second segment has a duration, and
the duration of the second segment is less than D2-1 second, where D2 is in units of seconds.
2. The method of claim 1, wherein
generating the modified manifest comprises inserting the set of N1 URLs into the manifest at an insertion point for a first ad break.
3. The method of claim 2, wherein
at least a first ad set can fill the first ad break,
the first ad set has a required number of segments, and
N1 is equal to the first ad set's required number of segments.
4. The method of claim 3, wherein
a second ad set can also fill the first ad break, the second ad set having a required number of segments equal to N2, and
N1>N2.
5. The method of claim 2, wherein
M ad sets can fill the first ad break, each one of the M ad sets having a required number of segments, and
N1=max (s1, s2, . . . , sM), where si for i=1 to M is the ith ad set's required number of segments.
6. The method of claim 2, wherein generating the modified manifest comprises inserting into the manifest first segment grouping information for forming two or more groups of URLs.
7. The method of claim 6, wherein
inserting into the manifest the first segment grouping information comprises inserting into the manifest a discontinuity tag such that in the modified manifest the discontinuity tag comes after the first URL but comes before the second URL.

8. The method of claim 1, further comprising:
after providing the modified manifest to the player, submitting to an ad stitcher an ad request for triggering the ad stitcher to select a set of ads to fill a first ad break;
receiving from the ad stitcher a response responsive to the ad request, the response comprising a set of S segment URLs or a set of S ad segments, where S<N1, wherein the set f S segment URLs comprises a first ad URL or the set of S ad segments comprises a first ad segment; and
mapping the first URL included in the list of URLs with the first ad URL or the first ad segment.

9. The method of claim 1, wherein
D1 is greater than or equal to 3, and
the duration of the second segment is less than 1 second.

10. The method of claim 2, wherein
the manifest indicates an insertion point for a second ad break,
the manifest comprises second ad break duration information indicating a duration of the second ad break, and
generating the modified manifest further comprises inserting into the manifest at the insertion point for the second ad break a list of N2 URLs, where N2>1.

* * * * *